United States Patent
Kotara et al.

(10) Patent No.: US 11,144,813 B1
(45) Date of Patent: Oct. 12, 2021

(54) RECURRENT NEURAL NETWORKS TO PREDICT USER REQUESTS

(71) Applicant: UIPCO, LLC, San Antonio, TX (US)

(72) Inventors: Brandon Scott Kotara, New York, NY (US); Gunjan Chandraprakash Vijayvergia, San Antonio, TX (US); Jon Eric Weissenburger, Frisco, TX (US); Ben Hawkins, Plano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 895 days.

(21) Appl. No.: 15/910,325

(22) Filed: Mar. 2, 2018

(51) Int. Cl.
*G06N 3/04* (2006.01)
*G06N 3/08* (2006.01)
*G06N 20/20* (2019.01)
*G06N 20/10* (2019.01)
*G06N 20/00* (2019.01)

(52) U.S. Cl.
CPC ............ *G06N 3/04* (2013.01); *G06N 3/0454* (2013.01); *G06N 3/08* (2013.01); *G06N 20/00* (2019.01); *G06N 20/10* (2019.01); *G06N 20/20* (2019.01); *G06N 3/084* (2013.01)

(58) Field of Classification Search
CPC ........ G06N 20/00; G06N 20/10; G06N 20/20; G06N 3/04; G06N 3/0445; G06N 3/0454; G06N 3/0472; G06N 3/0481; G06N 3/08; G06N 3/084
See application file for complete search history.

(56) References Cited

U.S. PATENT DOCUMENTS

| | | | |
|---|---|---|---|
| 2013/0041857 A1* | 2/2013 | Medlock | G06F 40/274 706/14 |
| 2017/0200077 A1* | 7/2017 | Weston | G06F 40/279 |
| 2018/0157638 A1* | 6/2018 | Li | G06N 3/08 |

* cited by examiner

*Primary Examiner* — Shane D Woolwine
(74) *Attorney, Agent, or Firm* — Perkins Coie LLP

(57) ABSTRACT

Embodiments described herein disclose methods and systems for using more than one Recurrent Neural Network (RNN) to analyze a user input and to predict a request being made by the user as the user is inputting the request. In an embodiment, a first RNN and a second RNN can simultaneously or near simultaneously process the user requested information by separating and analyzing the characters and words in the user's request. A third RNN can process the output vectors generated by the first and second RNNs to identify one or more solutions that predict the user's request.

20 Claims, 11 Drawing Sheets

RECURRENT NEURAL NETWORKS TO PREDICT USER REQUESTS

TECHNICAL FIELD

This disclosure is directed generally to predicting user requests using recurrent neural networks.

BACKGROUND

Neural networks can allow computing systems to process information to provide solutions such as speech recognition and image recognition. Neural networks can include a computational node or unit that can compute an output based on an input that can be received from another node or from an input source. The nodes or units can be arranged in different configurations. For example, a neural network can include a set of input nodes, hidden nodes, and output nodes. Input nodes can receive and pass information to another layer. Hidden nodes may be optional and perform intermediate processing of information. Finally, output nodes can map information received from another node to a desired output.

Figure 1A:
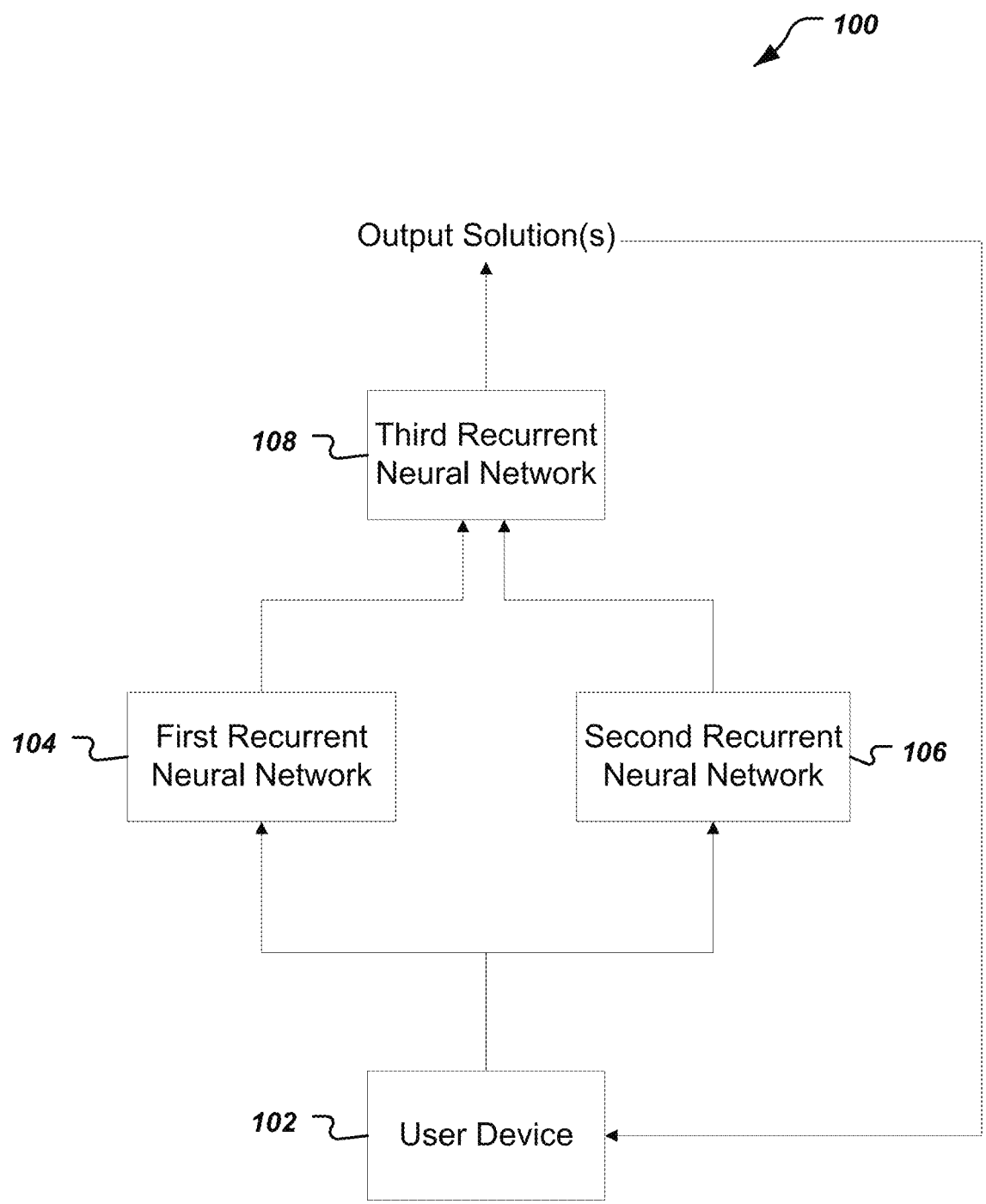
FIG. 1A illustrates a block diagram for an example of a neural network system.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Neural networks allow computing systems to respond to a user's request for certain information. In some cases, computing systems may not provide the information requested by the user at least because the neural network may not be able to understand the user's request. Furthermore, the computing systems may delay in providing the information requested by the user at least because the neural network may require the user to enter the entire request before the neural network processes the user's request to determine what is being requested by the user and only then presents to the user some information based on the neural network's determination of the information requested by the user.

In some embodiments, as further described below, a neural network system can predict a user's intent with each keystroke of his or her question or request. In some embodiments, the system can also provide an asynchronous feedback mechanism so that a user can select the solution corresponding to his or her input without typing the entire question or request. A benefit of the exemplary neural network is that it can reduce the delay associated with the questions being interpreted incorrectly in part because the system can determine one or more solutions that are predictions of the request being made by the user and present those solutions to the user for selection. The solutions can be pre-configured such that a system processing the request understands the exact meaning of the request.

FIG. 1A illustrates a block diagram for an example of a neural network system 100. In some embodiments, the neural network system 100 includes more than one recurrent neural networks (RNN), such as a first RNN 104, a second RNN 106, and a third RNN 108, that are arranged to receive and process the information requested by a user. An RNN is a type of neural network that can move data forward between the nodes and that can also move data backwards from a node in a later processing stage to a node in an earlier processing stage. Thus, an output of a RNN can be dependent on previous computations. One benefit of using a RNN in the exemplary neural network system is that a RNN can process sequential data to provide sequence recognition. As further explained below, the one or more output solutions in FIG. 1A are predictions of a user request as determined by the RNNs. In some embodiments, the third RNN 108 can send the one or more output solutions to the user device 102 for user selection.

Figure 2B:
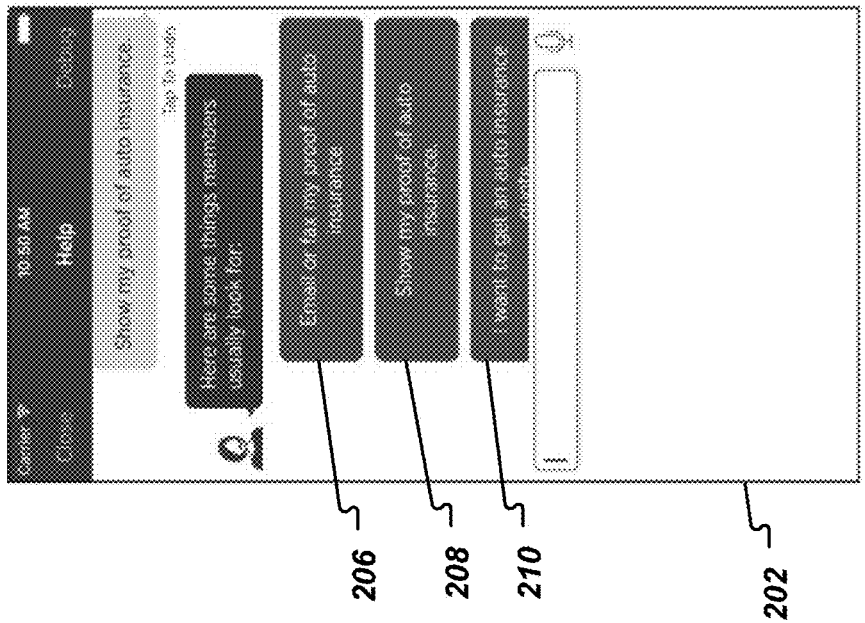
FIGS. 2A, 2B, 2C, and 2D show examples of a user device sending a request for information and receiving one or more predictions of a user request.
Figure 2A:
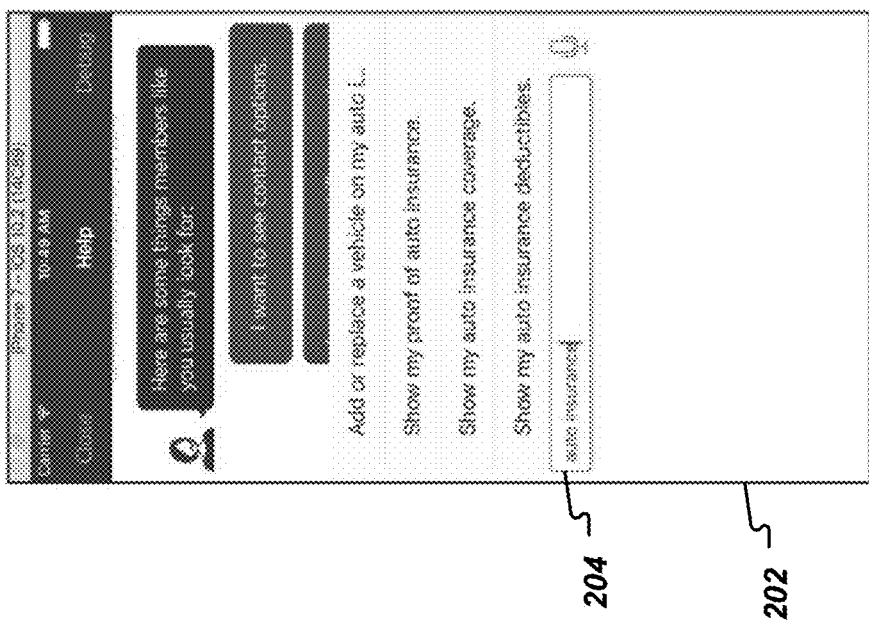

In some embodiments, the first and second RNNs 104, 106 can receive information typed by a user on an user device 102, such as a computer, laptop, smartphone, or a tablet. As an example, as shown in FIG. 2A, a user can request his or her automobile insurance information by typing in "auto insurance" as an input 204 into the user device 202. Returning to FIG. 1A, the inputs of both the first and second RNN 104, 106 can simultaneously or near simultaneously receive and process the input typed by the user on the user device 102. The phrase "simultaneously" means at the same time or almost simultaneously (e.g., within milliseconds) and "near simultaneously" means within a few hours.

As further explained below in FIGS. 1C and 1D, both the first and second RNNs 104, 106 process the information received from the user's input based on embedding layers and additional processing by the components associated with each RNN. As part of the processing operation, the first and second RNNs 104, 106 can analyze the individual string of characters as well as the array of words in the search bar and provide outputs that can be fused together by the third RNN 108 to provide a best guess or a number of top guesses given the user's input into a search bar. After the processing operation, both the first and second RNNs 104, 106 generate output vectors that are sent to the third RNN 108. The third RNN 108 processes the combination of the output vectors to identify and generate one or more output solutions that is a prediction of a request being made by the user. The third RNN 108 can send the one or more solutions to a user device so that a user can select and request information associated with one of the solutions. Continuing with the example mentioned above, FIG. 2B shows that the user device 202 can display one or more solutions (e.g., predictions of what information the user may be requesting or questions the user may be asking) based on the neural network system's analysis of the user request for "auto insurance." FIG. 2B shows some examples of one or more solutions that includes an application, for example, a mobile application on a portable electronic device, that displays "Email or fax my proof of auto insurance" 206, "Show my proof of auto insurance" 208, and "I want to get an auto insurance quote" 210. The user can select any one of the displayed solutions to get information associated with the user's selection. For example, if the user selects "Show my proof of auto insurance" 208, then a server (not shown) can send to the user the user's proof of auto insurance. In some implementations, the server can send deep links to a user's portable electronic device so that if a user selects a link from the application, the link can directly to the location that has the user requested information. Using the example from above, the deep links can include a link associated with a document page that includes a proof of insurance. FIGS. 2C and 2D provide additional examples of a user requesting certain information, the neural network system providing to the user device one or more solutions based on the neural network system's analysis of the user requested information.

Figure 1B:
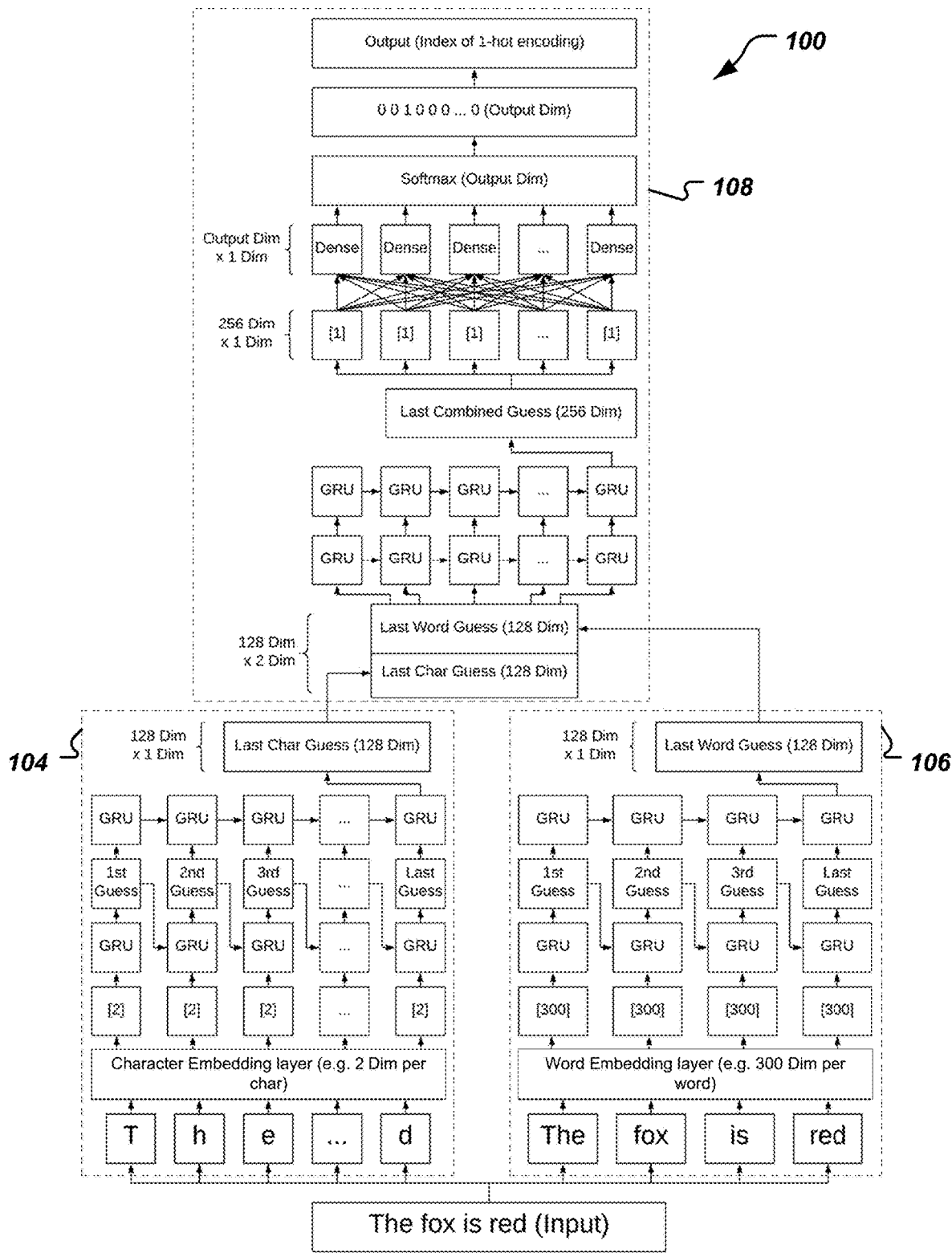
FIG. 1B illustrates an example of a neural network system.

FIG. 1B illustrates an example of a neural network system 100 that can analyze a user's request or question and can provide one or more solutions to the user based on the analysis. The first and second RNNs 104, 106 can include gated recurring units (GRUs) that can process the information received by the respective embedding layers, as further explained below. The GRUs in FIG. 1B are connected in a way that allows each GRU to expect one input, and possibly one previous state input. The previous state input can be empty for the GRU handling the initial input of a sequence. In some embodiments, each RNN can use a single GRU at least because the second increment of an RNN expects input from the first increment so that both sets of RNNs may not compute concurrently. In embodiments using a single GRU for each RNN, the same GRU can be used over again for each sequential increment. In some other embodiments, more than one GRU can be used in each RNN. The term Dim and values associated with Dim refers to exemplary dimensions. On the bottom of FIG. 1B is provided an example of a text input by a user on the user's device (not shown). In some embodiments, the example text "The fox is red" can be simultaneously or near simultaneously received by the first and second RNNs 104, 106.

Figure 1C:
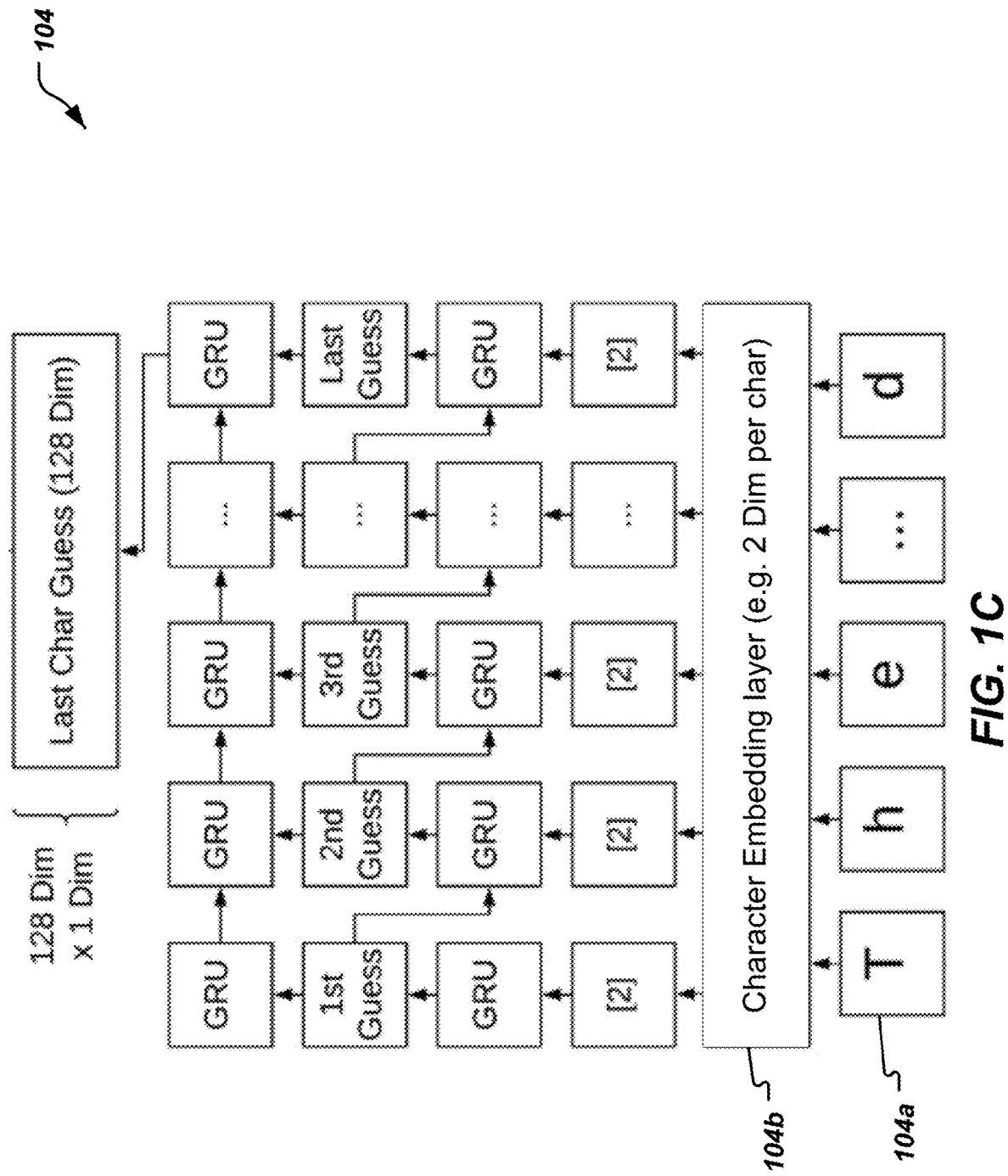
FIGS. 1C, 1D, and 1E shows an expanded view of first, second, and third recurrent neural networks, respectively.
Figure 2C:
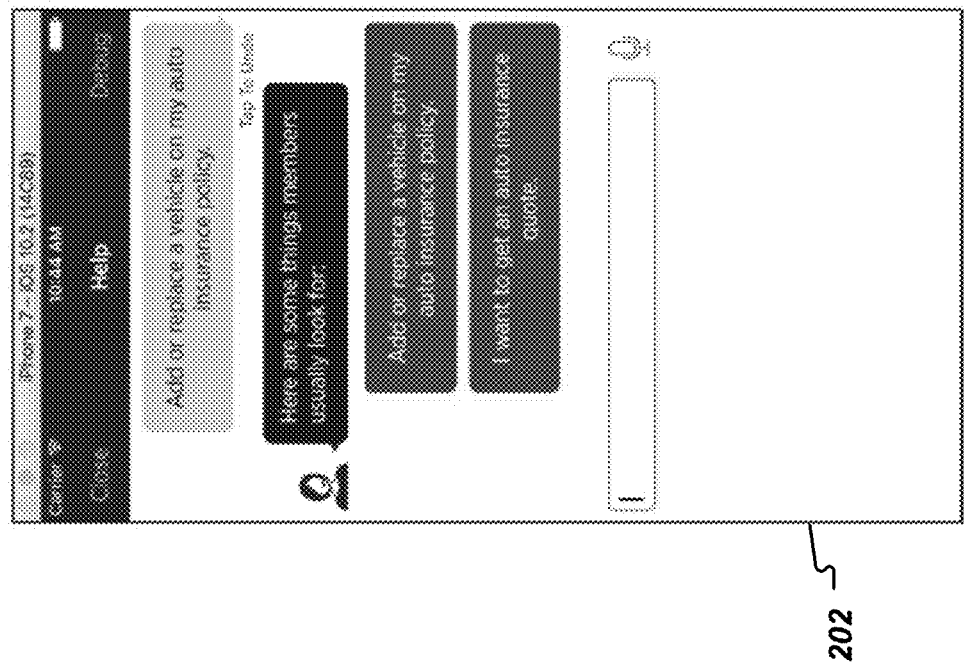
Figure 2D:
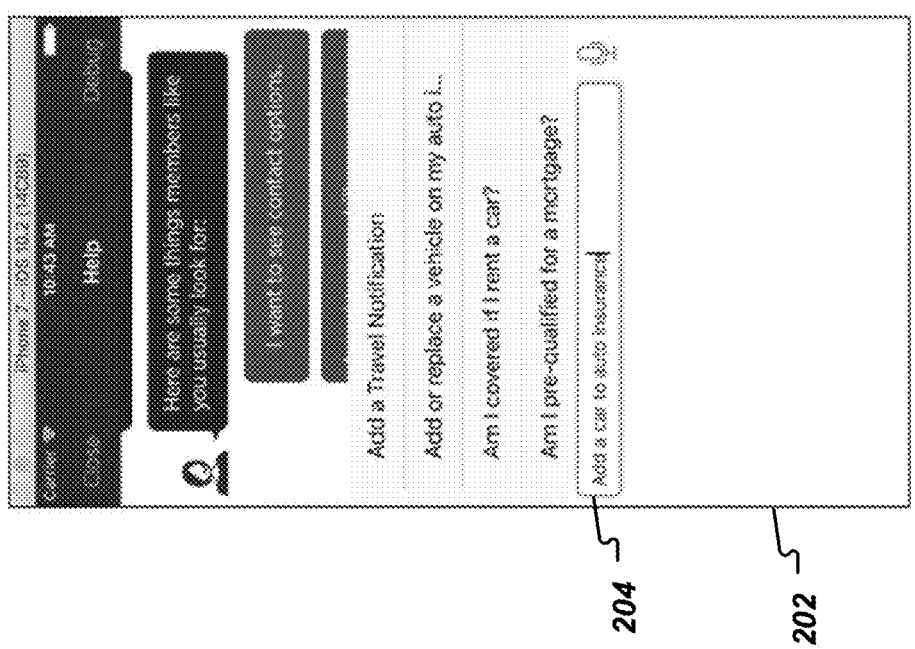

FIG. 1C shows an expanded view of the first RNN 104 shown in FIG. 1B. The first RNN 104 can process the input text by breaking up the text into a string of characters. In some embodiments, a string of characters can include letters, spaces, or punctuation. As shown in FIG. 1C, the input 104*a* of first RNN 104 receives individual characters, such as the example characters, "T", "h", "e" and so on till the last character "d." The first RNN 104 can include a character embedding layer 104*b* that can be trained by including a set of character embeddings that can include a set of possible characters that can be input by the user and analyzed by the first RNN 104. As an example, a set of character embeddings can include twenty-six values for a RNN that is designed to analyze individual letters input by the user. As another example, a set of character embeddings can include a set of pre-determined ASCII characters to be analyzed by the first RNN 104. The character embedding layer 104*b* can provide a weight for each input character using the set of character embeddings. The character embedding layer 104*b* can also generate a L-dimension vector for each character. In FIG. 1C, the character embedding layer 104*b* can generate as an example a two-dimension vector per character. Each sequential output of the character embedding layer 104*b* can be a translated version or a representation of a corresponding sequential input. The L-dimension vector is the neural network's representation of the input. In the above example, L-dimension vector can be a two-dimension representation of a single character. The values of the L-dimension vector can be unique to each trained version of the neural network.

The first RNN 104 also generates a first vector from the L-dimension vector based on processing or computation performed by the one or more GRUs of the first RNN 104. The first vector indicates a possible next character(s) based on the string of characters typed by the user. An example of the first vector is shown in FIG. 1C as a 128 Dim×1 Dim Last Char Guess.

Figure 1D:
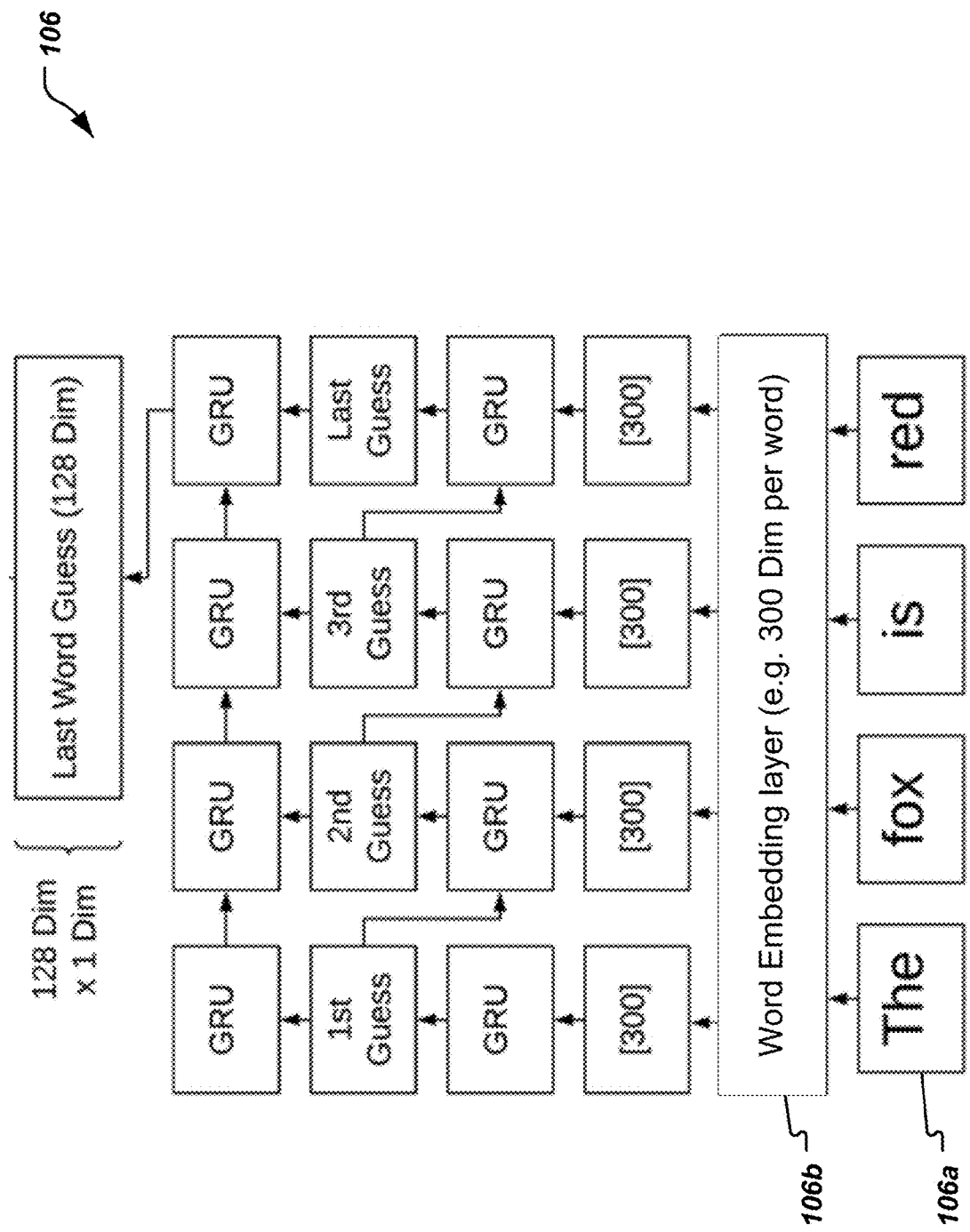

FIG. 1D shows an expanded view of the second RNN 106 shown in FIG. 1B. The second RNN 106 can process the input text by breaking up the text into one or more words. As shown in FIG. 1D, the input 106*a* of second RNN 106 receives one or more words, such as the example words, "The", "fox", "is," "red." The second RNN 106 can include a word embedding layer 106*b* that can be trained by including a M-dimension word embedding vector that can include a set of possible words that can be input by the user and analyzed by the second RNN 106. As an example, a M-dimension word embedding vector can include a 300-dimension vector. The word embedding layer 106*b* can map each word input by the user onto a M-dimension vector using the M-dimension word embedding vector. The mapping of the word embedding can be performed by a pretrained word embedding layer that can be considered a map. Using the above example, if the word-embedding output dimension was 2, the word "fox" may have been learned by a network to equal [1, 2], and the word "the" could equal [9, 4]. In this example, the words "the fox" would map to [9, 4], [1, 2]. Such mapping is useful at least because the input is now a 2×2 matrix. Furthermore, the pretrained word-embedding can assign similar vectors to synonyms or tangential words. The vectors for "fox" and "the" can carry additional meaning about the relationship of the words to each other and also about the word corpus included as part of the pretrained word embedding layer.

The second RNN 106 also generates a second vector from the M-dimension vector. The second RNN 106 produces outputs using, for example, a tuned guess-and-check technique. A guess-and-check technique allows the second RNN 106 to estimate or guess the first output, which can allow the second RNN 106 to estimate or guess the second output based on the estimated first output and second input. After the second RNN 106 propagates its estimates through the rest of the network and a final output is estimated, the network is provided the desired output that can be included in the training as further described in this patent document. After the second RNN 106 provides the desired output, the second RNN 106 uses back propagation, adjusting of the weights in, for example, all the previous layers, to tune to network so the next time it sees a similar output its guess can be closer to the given desired output. Hence, the more the second RNN 106 is provided similar input or output pairs, the more its guesses can be drawn to the desired output, making the second RNN 106 more accurate. In the prediction state, the second RNN 106 can use its learned weight matrices to produce outputs. As an example, the output of a single GRU can be simplified to be the following: Sigmoid (Input Weight Matrix*Input Vector)+Sigmoid (Previous State Weight Matrix*Previous State Vector).

The second neural network generates a second vector that indicates the possible next word(s) based on the words typed by the user. An example of the second vector is shown in FIG. 1D as a 128 Dim×1 Dim Last Word Guess.

In some embodiments, the first and second RNNs 104, 106 can simultaneously or near simultaneously perform the processing operation on the received input text as explained above.

As further explained below, a benefit of using the first and second RNNs to separately process characters and words is to facilitate weighing of the output generated the first and second RNNs to determine an output solution. For example, if output of the first RNN indicates that the string of characters are not related to terms known to the third RNN, and if the output of the second RNN indicates the array of words are known to the third RNN, then the third RNN can weigh the output of the second RNN more than the output of the first RNN.

Figure 1E:
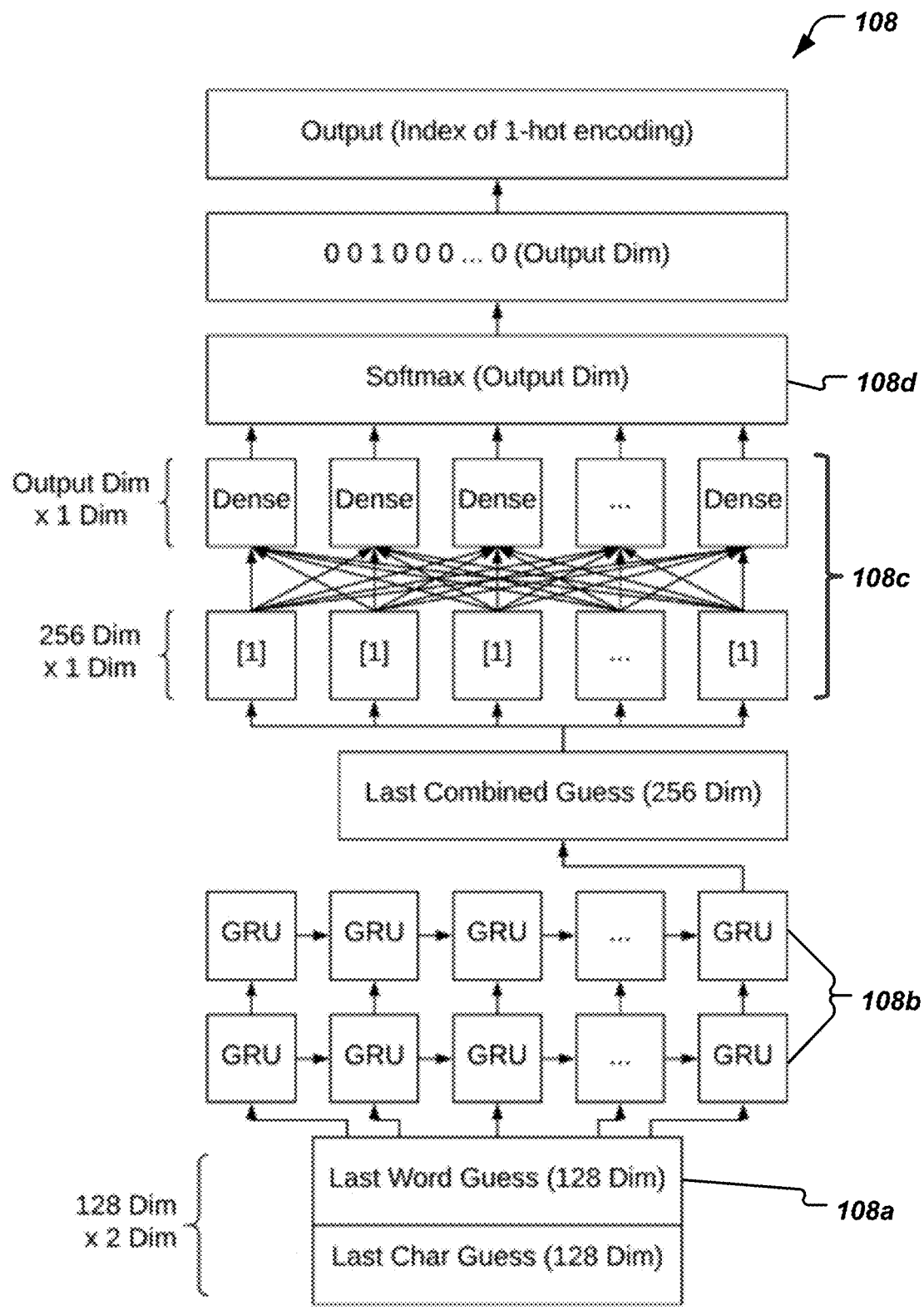

FIG. 1E shows an expanded view of the third RNN 108 shown in FIG. 1B. The third RNN 108 includes inputs 108*a* that receives the first and second vectors from the first and second RNNs, respectively. As shown in FIG. 1E, each of the first and second vectors are, for example, 128 Dim×1 Dim. As further explained below, the third RNN 108 can process the first and second vectors to obtain a third vector based on a weighting of the first and second vectors. The weighting can be determined by a content of the input typed by the user.

The GRUs 108*b* of the third RNN 108 can process the first and second received vectors by combining the two vectors to obtain a combined vector. As shown in FIG. 1E, the combined vector is, for example, a 256 Dim×1 Dim vector. Next, the fully connected layers 108*c* process the combined vector to obtain a processed vector. The third RNN 108 can receive the concatenated outputs of the Word and Char networks as if it were a sequence. Hence, the mathematical operation of the third RNN can be the same as that of the first and second RNNs. The first and second vectors are concatenated on top of each other so that the first Word "guess" and first Char "guess" are viewed as the first data point in a new sequence. A Softmax function 108*d* can be performed by the third RNN 108 on the processed vector to obtain the third vector that includes values that add up to one. An index value associated with a highest value in the third vector can be determined by the third RNN 108. The third RNN 108 can also use a pre-determined array of solutions to determine an output solution located at the index value associated with the pre-determined array. The output solution relates to the information requested by the user.

In some embodiments, a 1-hot encoding can be optionally performed on the output of the Softmax function to match the Softmax function output to a desired or pre-determined category. 1-hot encoding can be performed by taking a single input vector and makes one of its values 1, and all the others 0. 1-hot encoding can be performed after running the vector through a Softmax function, which takes an input vector and outputs a categorical distribution so that the vector's values can add to one and proportionality can be maintained. For example, a Softmax output could be [0.18, 0.02, 0.43, 0.37], which would mean, in a categorical situation, that the category at index 1 is an 18% match, while the category at index 2 is a 2% match, and so on. This is useful because in a categorical problem, such as auto-suggest, where there are a fixed number of categorical outputs, the outputs can be mapped to numbers, such as indexes, and the indexes can be further mapped to their corresponding 1-hot encodings. For example, if there were four categories: "insurance", "banking", "investing", and "send money," then indexes can be used to represent the four categories so that "insurance" can be 1, "banking" can be 2, and so on. The corresponding 1-hot encoding for "insurance" would then be [1, 0, 0,0] and for "banking" it would be [0, 1, 0, 0] where the 1 is at the index of the corresponding output. In FIG. 1E, a Softmax vector can be 1-hot encoded by assigning 1 to the highest categorical probability. In the first example provided above in this paragraph, the Softmax output [0.18, 0.02, 0.43, 0.37] would map to [0, 0, 1, 0]. And, using the second example provided above in this paragraph, the third RNN 108 can claim that the best output relates to "investing," since it's the output in index 3. The choice of index for the categorical outputs can be arbitrary at least because the network can learn a unique mapping of input to 1-hot encoded output for any order of indexes given the same indexes can be used for training and prediction. In some embodiments, training can be performed on the neural network if categories are changed, added, or removed.

The output solution of the third RNN 108 can be sent to the user device (not shown in FIG. 1E). The output solution is a prediction of a request being made by the user. In some embodiments, the third RNN 108 can send the output solution to the user device 102, as shown in FIGS. 1A and 1B.

In some embodiments, the third RNN 108 can determine one or more output solutions located at one or more index values of the third vector in reverse order, starting with highest value in the third vector. The one or more solutions are one or more prediction of a request being made by the user. In some embodiments, the number of output solutions can be predetermined. For example, a third RNN 108 can be designed to provide the top three solutions that are associated with the highest, second highest, and third highest values in the third vector. The one or more solutions identified by the third RNN 108 can be sent to the user device as explained in this patent document. FIG. 2B shows an example of three output solutions 206, 208, 210 that are sent to and displayed on a user device 202.

In some embodiments, a second input can be received that provides user specific information from the user device. The second input can include at least one of a location of the user or recent activity related to an account of the user (e.g., searches, information accessed, bills paid, calls made). The third RNN 108 can process the second input with the third vector to determine the content of the input typed by the user. In some embodiments, the neural network of FIG. 1F can be used to add and process a user's geo-location, such as a sequence of latitudes and longitudes. In such an embodiment, a sequence processing neural network similar to the char and word networks, as shown in FIGS. 1C and 1D, would provide an output as an additional network in the bottom of FIG. 1F. The sequence processing network, such as a fourth RNN, can be used for processing latitudes and longitudes with an input dimension of, for example, 2× Sequence Length (S), where each step of the sequence can be an array such that the number at index 1 is latitude, and index 2 is longitude: [Latitude, Longitude]. Hence, the sequence can represent movement over time of the user where the first item in the sequence is location at time 0 and the last item in the sequence is location at time t*S, where t can be a pre-determined time step, the period between location samples. In some embodiments, the same RNN related operations described earlier for the char and word RNNs can take place on this sequence and the output vector of a fourth RNN be concatenated with the char and word outputs, just as the word output was concatenated with the char output. The output vector of the fourth RNN can be representation of the location sequence obtained from the user's portable electronic device. In some embodiments, a neural network can be provided training examples of location sequences that could influence an auto-suggest output. Such an example may be a user driving to a bank and then using auto-suggest. In this example, auto-suggest may have a higher chance of suggesting banking related intentions of the user. In some embodiments, the output vector of the fourth RNN can represent the recent activity related to the user so that the output vector can be concatenated with the char and word outputs as described in this patent document.

Figure 1F:
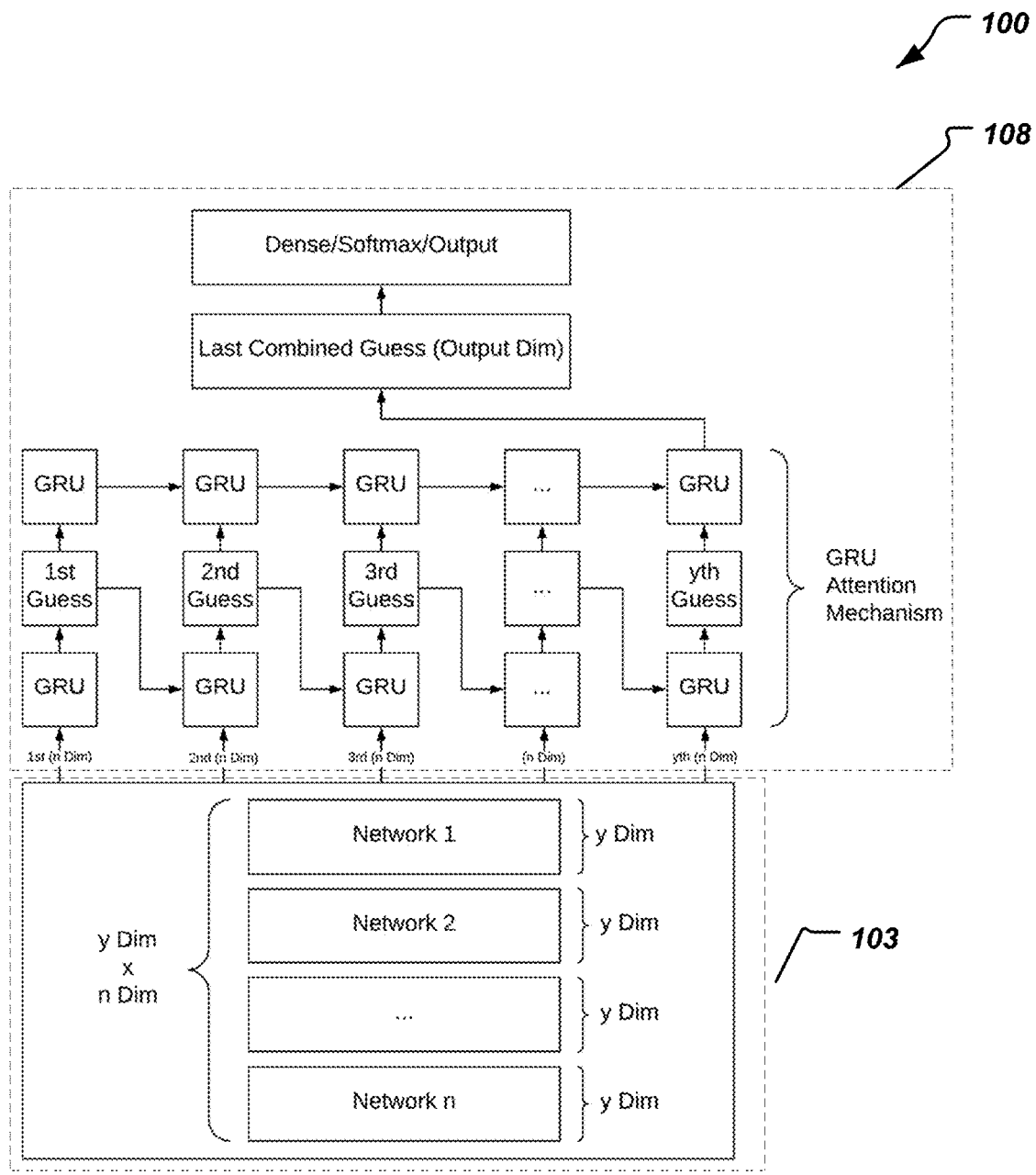
FIG. 1F shows another example of a neural network system.

FIG. 1F shows another example of a neural network system 100 that can analyze a user's request or question and can provide a solution to the user based on the analysis. The networks in FIG. 1F can outputs of sub-networks, such as the outputs of the first and second RNN described in FIGS. 1C-1D. The term dense in FIG. 1F refers to fully connected layers. The networks in FIG. 1F are neural networks that can have a sequence output that can be further processed by the third RNN 108, as described above. FIG. 1F can be considered a more general and scaled version of the neural network system shown in FIG. 1E. As an example, FIG. 1F shows that the neural network system of FIG. 1E can be scaled to include more than two sub-networks 103, such as more than two RNNs. While FIG. 1E can be implemented for an auto-suggest feature, the neural network system of FIG. 1F can be implemented to use variable input sources, such as the geolocation addition discussed above.

Figure 3:
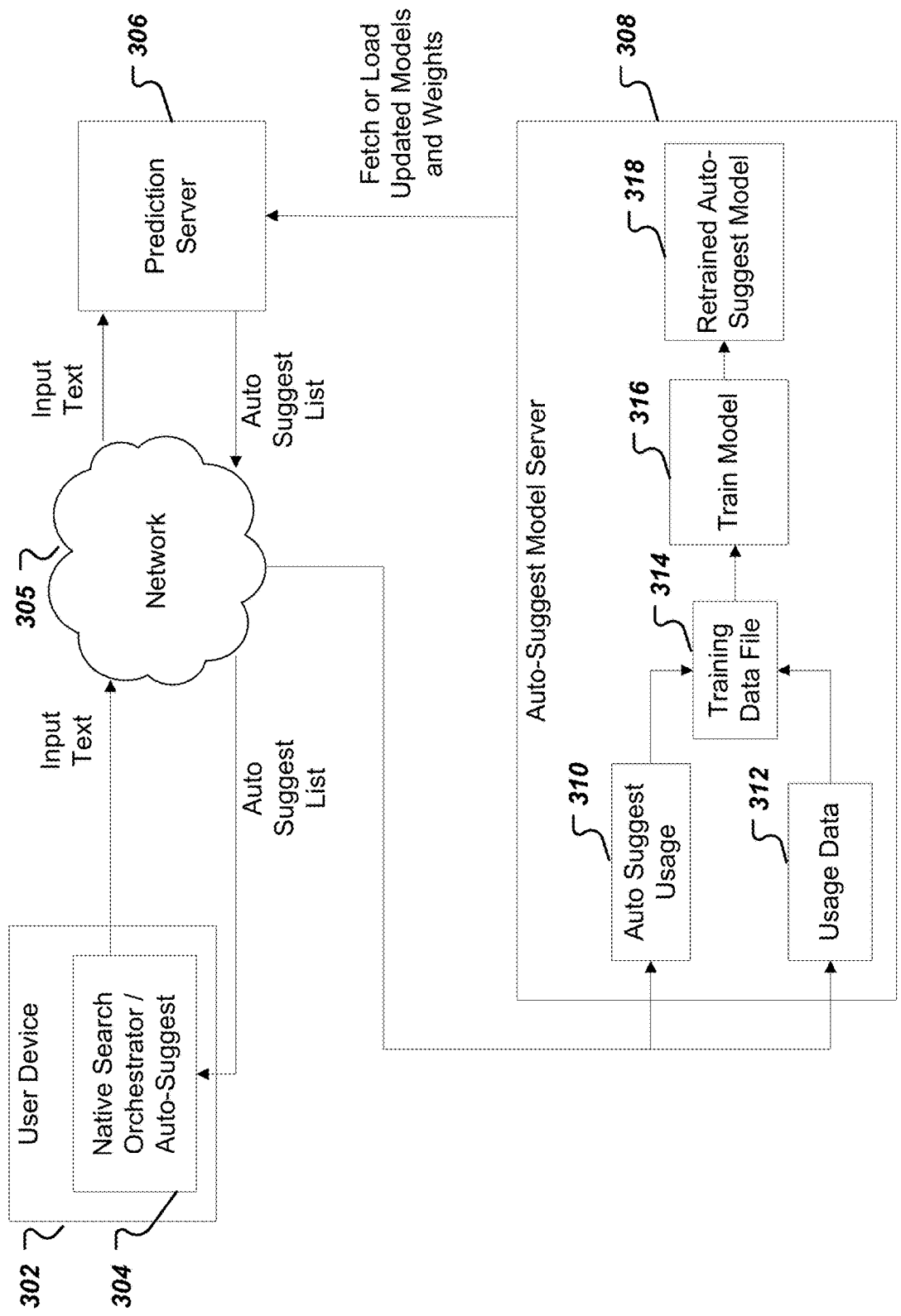
FIG. 3 illustrates a block diagram for implementing a neural network system using a cloud solution.

FIG. 3 illustrates a block diagram for implementing a neural network system using a cloud solution. A user device 302 can input a request or question in the form of a text to a native search orchestrator 304 that may be an application or a program that resides on the user device 302. The native search orchestrator 304 can send the text to a prediction server 306 via the cloud 305. The prediction server 306 can perform operations to determine one or more suggestions associated with the input text. In some embodiments, in response to the user input, the prediction server 306 can determine one or more suggestions using the neural network system as described above in FIGS. 1A-1F. The prediction server 306 can send through the cloud 305 the one or more suggestions or solutions in a list to the user's device 302. The cloud 305 may include the internet, a radio frequency (RF) network, or a communication network.

The prediction server 306 may include an auto-suggest model that includes one or more data such as a set of character embeddings, a M-dimension word embedding vector, weights for character and word embeddings, and weights for the combination of the vectors from the first and second RNNs. The auto-suggest model can be stored in the prediction 306 and the auto-suggest model can be loaded in the memory of the prediction server 306 at startup. In some embodiments, data for the auto-suggest model can be loaded into the prediction server 306 as part of a rolling update or data for the auto-suggest model can be requested by the prediction server 306.

In some embodiments, the auto-suggest model and associated data can be sent from an auto-suggest model server 308. The auto-suggest model server 308 can collect and store in a database a training data file 314 that can be used to update the auto-suggest model as described below. The training data file may include data associated with usage data 312 that can be extracted or sent from the native search orchestrator 304 and that can relate to a user's interactions with the text suggested by the native search orchestrator 304. The training data file 314 may also include auto-suggest usage 310 that can be sent from the user device 302 and that can be associated with a user's selection of a solution identified by the prediction server 306.

The auto-suggest model server 308 can process or train the auto-suggest model 316 to generate an updated model configurations and weights that can be used to retrain the auto-suggest model 318. The retrained auto-suggest model can be stored in a database associated with the auto-suggest model server 308 and can be loaded into the prediction server 306 as described above. A benefit of gathering and processing the training data file to retrain or update the auto-suggest model is to create a closed-loop feedback system where a user's interactions with the user device can allow the prediction server 306 to determine better suggestions for subsequent user requests. In some embodiments, the prediction server 306 can be designed to perform the data gathering and data processing operations that are performed by the auto-suggest model server 308, as explained above.

The prediction server 306 can process the user input text using the auto-suggest model to determine one or more solutions from a pre-determined array of solution. As is shown in FIG. 3, the prediction server 306 can send to the user device 302 an Auto-Suggest List that includes the one or more solutions determined by the prediction server 306. The native search orchestrator 304 can display on the user device 302 the auto-suggest list for user selection. As mentioned above, FIG. 2B shows some examples of an auto-suggest list that includes "Email or fax my proof of auto insurance" 206, "Show my proof of auto insurance" 208, and "I want to get an auto insurance quote" 210.

Figure 4:
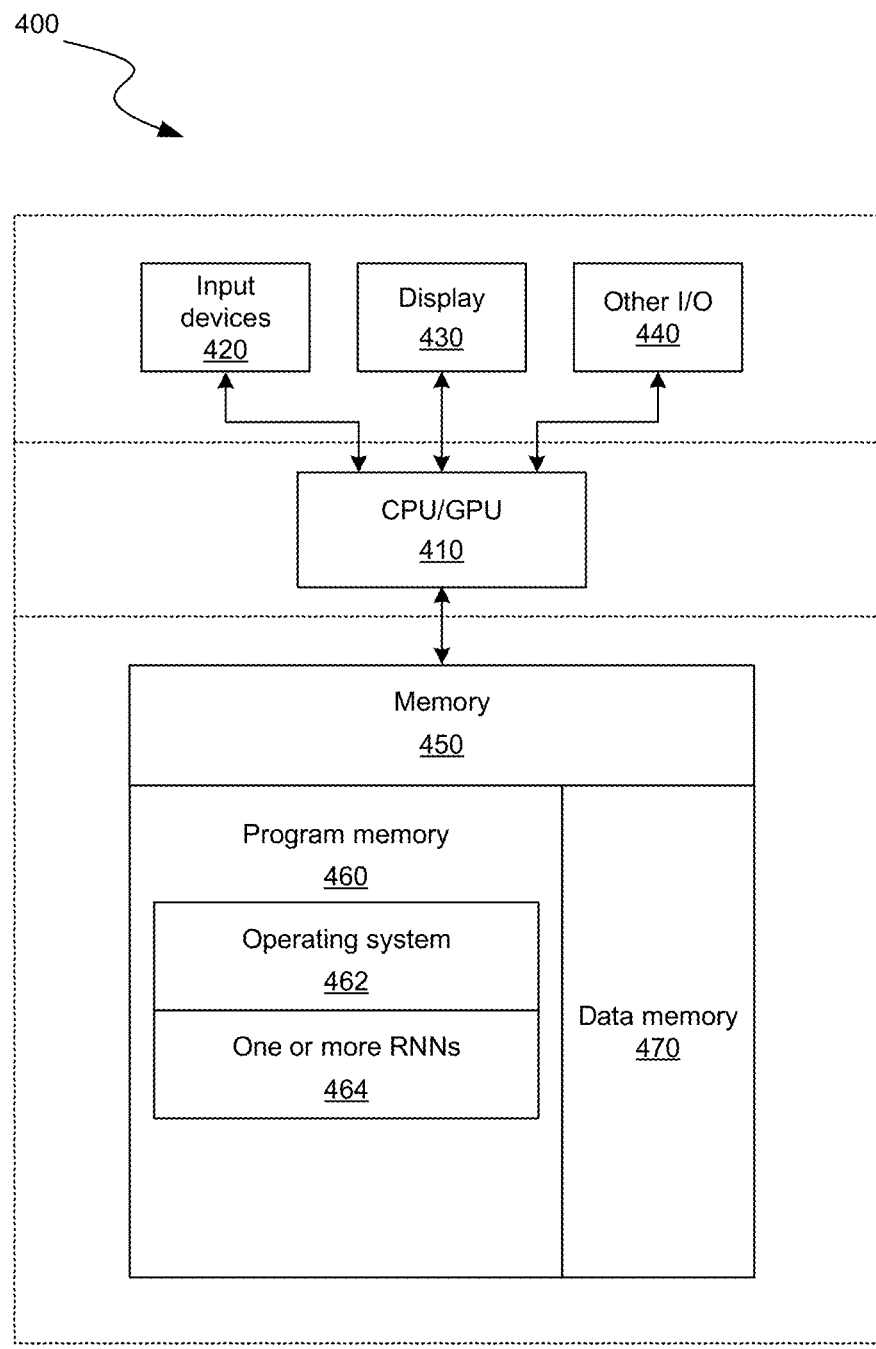
FIG. 4 is a block diagram illustrating an overview of devices on which some implementations of the disclosed technology can operate.

FIG. 4 is a block diagram illustrating an overview of devices on which some implementations of the disclosed technology can operate. The devices can comprise hardware components of a device 400 that manages one or more RNNs described in this patent document. Device 400 can include one or more input devices 420 that provide input to the CPU or GPU 410, notifying it of actions. The actions are typically mediated by a hardware controller that interprets the signals received from the input device and communicates the information to the CPU or GPU 410 using a communication protocol. Input devices 420 include, for example, a mouse, a keyboard, a touchscreen, an infrared sensor, a touchpad, a wearable input device, a camera- or image-based input device, a microphone, or other user input devices.

CPU or GPU 410 can be a single processing unit or multiple processing units in a device or distributed across multiple devices. CPU or GPU 410 can be coupled to other hardware devices, for example, with the use of a bus, such as a PCI bus or SCSI bus. The CPU or GPU 410 can communicate with a hardware controller for devices, such as for a display 430. Display 430 can be used to display text and graphics. In some examples, display 430 provides graphical and textual visual feedback to a user. In some implementations, display 430 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 440 can also be coupled to the processor, such as a network card, video card, audio card, USB, FireWire or other external device, camera, printer, speakers, CD-ROM drive, DVD drive, disk drive, or Blu-Ray device.

In some implementations, the device 400 also includes a communication device capable of communicating wirelessly or wire-based with a network node. The communication device can communicate with another device or a server through a network using, for example, TCP/IP protocols. Device 400 can utilize the communication device to distribute operations across multiple network devices.

The CPU or GPU 410 can have access to a memory 450. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 450 can include program memory 460 that stores programs and software, such as an operating system 462, one or more recurrent neural network 464. Memory 450 can also include data memory 470 that can include information requested by the user, a set of character embeddings, a M-dimension word embedding vector, weights for character and word embeddings, weights for the combination of the vectors from the first and second RNNs, a pre-determined array of solutions, etc., which can be provided to the program memory 460 or any element of the device 400. The CPU or GPU 410 can perform operations associated with the recurrent neural network as described in this patent document.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 5:
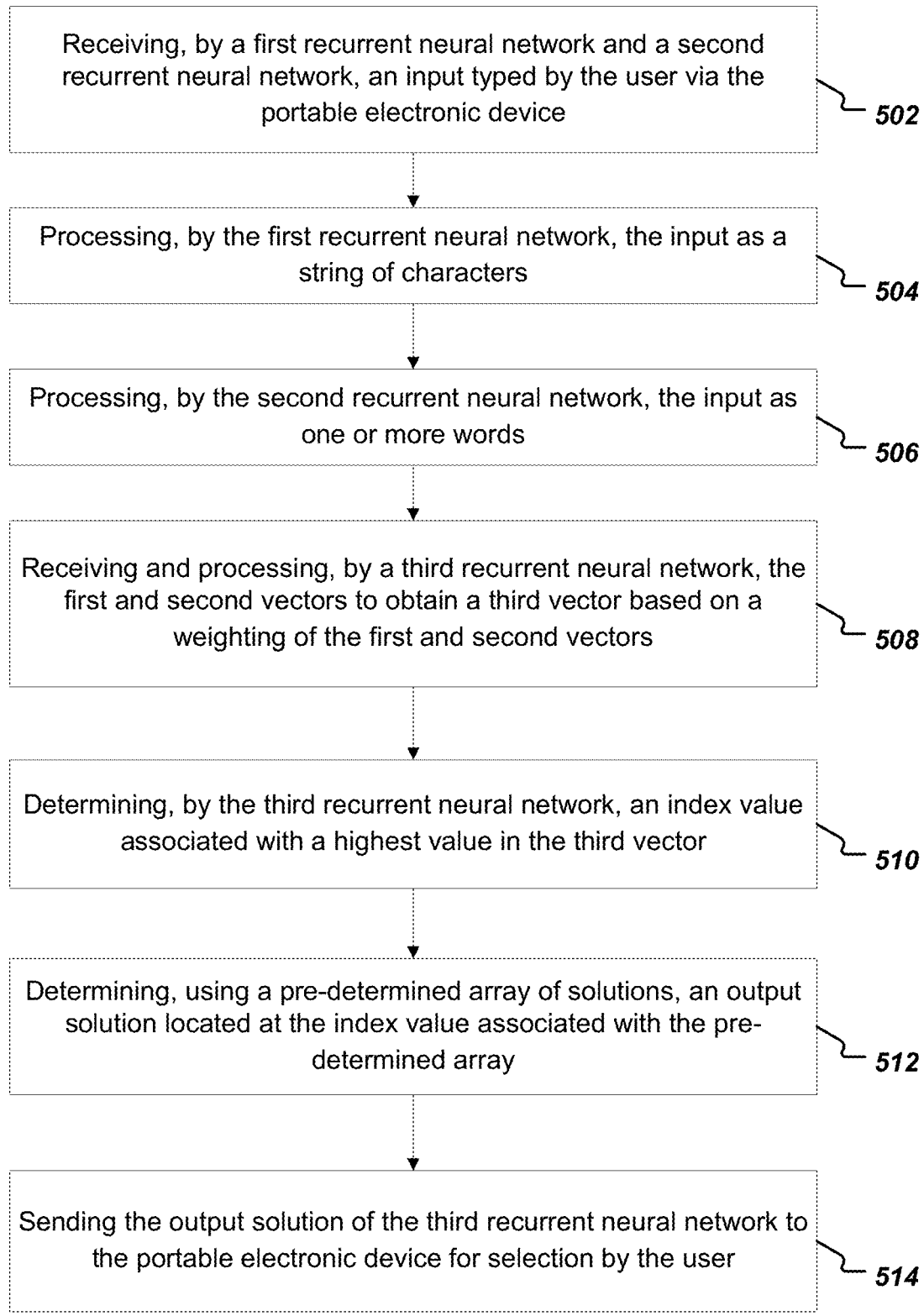
FIG. 5 shows a flowchart for the neural network system.

FIG. 5 shows an exemplary flowchart for the neural network system. At the receiving operation 502, a first recurrent neural network and a second recurrent neural network receive an input typed by the user via the portable electronic device. At the first processing operation 504, the first recurrent neural network processes the input as a string of characters that includes any one or more of letters, spaces, or punctuation. At the first processing operation 504, the first recurrent neural network also generates a first vector that indicates a possible next character based on the string of characters typed by the user. At the second processing operation 506, the second recurrent neural network processes the input as one or more words. At the second processing operation 506, the second recurrent neural network also generates a second vector that indicates the possible next word based on the words typed by the user. In some embodiments, the first and second recurrent neural networks respectively perform the first and second processing operations simultaneously or near simultaneously. At the receiving and processing operation 508, a third recurrent neural network receives and processes the first and second vectors to obtain a third vector based on a weighting of the first and second vectors, where the weighting is determined by a content of the input typed by the user. At the first determining operation 510, the third recurrent neural network determines an index value associated with a highest value in the third vector. At the second determining operation 512, a pre-determined array of solutions is used to determine an output solution located at the index value associated with the pre-determined array so that the output solution is a prediction of a request being made by the user. At the sending operation 514, the third recurrent neural network can send the output solution to the portable electronic device for selection by the user.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Several implementations of the disclosed technology are described above in reference to the figures. The computing devices on which the described technology may be implemented can include one or more central processing units, one or more graphic processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A method of processing information requested by a user via a portable electronic device, the method comprising:

receiving, by a first recurrent neural network and a second recurrent neural network, an input typed by the user via the portable electronic device;

processing, by the first recurrent neural network, the input as a string of characters, wherein the string of characters includes any one or more of letters, spaces, or punctuation,
wherein the first recurrent neural network generates a first vector that indicates a possible next character based on the string of characters typed by the user;

processing, by the second recurrent neural network, the input as one or more words, wherein the second neural network generates a second vector that indicates the possible next word based on the words typed by the user;

receiving and processing, by a third recurrent neural network, the first and second vectors to obtain a third vector based on a weighting of the first and second vectors, wherein the weighting is determined by a content of the input typed by the user;

determining, by the third recurrent neural network, an index value associated with a highest value in the third vector;

determining, using a pre-determined array of solutions, an output solution located at the index value associated with the pre-determined array, wherein the output solution is a prediction of a request being made by the user; and sending the output solution of the third recurrent neural network to the portable electronic device for selection by the user.

2. The method of claim 1, wherein the processing by the first recurrent neural network and the processing by the second recurrent neural network are performed simultaneously.

3. The method of claim 1, wherein the processing of the first and second vectors by the third recurrent neural network is performed by:

combining the first and second vectors to obtain a combined vector; and processing the combined vector to obtain a processed vector;

performing a Softmax function on the processed vector to obtain the third vector that includes values that add up to one.

4. The method of claim 1, wherein the processing by the first recurrent neural network comprises:

providing a weight for each character using a set of character embeddings;

generating a L-dimension vector for each character, wherein the L-dimension vector includes a representation of the string of characters;

generating a first vector from the L-dimension vector; and wherein the processing by the second recurrent neural network includes:

mapping each word onto a M-dimension vector using a M-dimension word embedding vector, and generating the second vector from the M-dimension vector.

5. The method of claim 1, further comprising:
determining, by the third recurrent neural network, additional index values starting from a second highest value in the third vector;
determining, using the predetermined array of solutions, additional output solutions located at the additional index values associated with the pre-determined array, wherein the additional output solutions are additional predictions of the request being made by the user;
sending, with the output solution, the additional output solutions of the third recurrent neural network to the portable electronic device to be selected by the user.

6. The method of claim 1, further comprising:
receiving, by a fourth recurrent neural network, a second input that provides user specific information, wherein the second input includes a location of the user;
processing, by the fourth recurrent neural network, the user specific information to provide a fourth vector that represents a location sequence of the user;
processing, by the third recurrent neural network, the fourth vector with the first and second vectors to obtain the third vector to determine the prediction of the request.

7. A system, comprising:
a first recurrent neural network and a second recurrent neural network configured to receive an input typed by a user via a portable electronic device;
the first recurrent neural network configured to process the input as a string of characters,
wherein the string of characters includes any one or more of letters, spaces, or punctuation; and
wherein the first recurrent neural network is configured to generate a first vector indicative of a possible next character based on the string of characters typed by the user;
the second recurrent neural network configured to process the input as one or more words,
wherein the second neural network is configured to generate a second vector indicative of the possible next word based on the words typed by the user;
a third recurrent neural network configured to:
receive and process the first and second vectors to obtain a third vector based on a weighting of the first and second vectors, wherein the weighting is determined by a content of the input typed by the user;
determine an index value associated with a highest value in the third vector;
determine, using a pre-determined array of solutions, an output solution located at the index value associated with the pre-determined array, wherein the output solution is a prediction of a request being made by the user; and
send the output solution to the portable electronic device for selection by the user.

8. The system of claim 7, wherein the first recurrent neural network and the second recurrent neural network are configured to simultaneously process the string of characters and one or more words, respectively.

9. The system of claim 7, wherein the first and second vectors are generated by the third recurrent neural network configured to:
combine the first and second vectors to obtain a combined vector; and
process the combined vector to obtain a processed vector;
perform a Softmax function on the processed vector to obtain the third vector that includes values that add up to one.

10. The system of claim 7,
wherein the string of characters is processed by the first recurrent neural network configured to:
provide a weight for each character using a set of character embeddings,
generate a L-dimension vector for each character, wherein the L-dimension vector includes a representation of the string of characters,
generate a first vector from the L-dimension vector; and
wherein the one or more words are processed by the second recurrent neural network configured to:
map each word onto a M-dimension vector using a M-dimension word embedding vector, and
generate the second vector from the M-dimension vector.

11. The system of claim 7, wherein the third recurrent neural network is further configured to:
determine additional index values starting from a second highest value in the third vector;
determine, using the predetermined array of solutions, additional output solutions located at the additional index values associated with the pre-determined array, wherein the additional output solutions are additional predictions of the request being made by the user;
send, with the output solution, the additional output solutions of the third recurrent neural network to the portable electronic device to be selected by the user.

12. The system of claim 7, further comprising:
a fourth recurrent neural network configured to:
receive a second input that provides user specific information, wherein the second input includes a location of the user;
process the user specific information to provide a fourth vector that represents a location sequence of the user;
wherein the third recurrent neural network is further configured to process the fourth vector with the first and second vectors to obtain the third vector to determine the prediction of the request.

13. The system of claim 7, further comprising:
a fourth recurrent neural network configured to:
receive a second input that provides user specific information, wherein the second input includes recent activity related to an account of the user;
process the user specific information to provide a fourth vector that represents the recent activity related to the account of the user;
wherein the third recurrent neural network is further configured to process the fourth vector with the first and second vectors to obtain the third vector to determine the prediction of the request.

14. A non-transitory computer-readable storage medium comprising a set of instructions to cause one or more processing units to:
receive an input typed by a user via a portable electronic device;
process the input as a string of characters to generate a first vector indicative of a possible next character based on the string of characters typed by the user, wherein the string of characters includes any one or more of letters, spaces, or punctuation;
process the input as one or more words to generate a second vector indicative of the possible next word based on the words typed by the user;

receive and process the first and second vectors to obtain a third vector based on a weighting of the first and second vectors, wherein the weighting is determined by a content of the input typed by the user;

determine an index value associated with a highest value in the third vector;

determine, using a pre-determined array of solutions, an output solution located at the index value associated with the pre-determined array, wherein the output solution is a prediction of a request being made by the user; and send the output solution to the portable electronic device for selection by the user.

15. The non-transitory computer-readable storage medium of claim 14, wherein the string of characters and one or more words are processed simultaneously.

16. The non-transitory computer-readable storage medium of claim 14, wherein the set of instructions that, when executed by the one or more processing units, cause the one or more processing units to generate the first and second vectors, include instructions that, when executed by the one or more processing units, cause the one or more processing units to:

combine the first and second vectors to obtain a combined vector; and process the combined vector to obtain a processed vector;

perform a Softmax function on the processed vector to obtain the third vector that includes values that add up to one.

17. The non-transitory computer-readable storage medium of claim 14, wherein the set of instructions that, when executed by the one or more processing units, cause the one or more processing units to process the string of characters, include instructions that, when executed by the one or more processing units, cause the one or more processing units to:

provide a weight for each character using a set of character embeddings, generate a L-dimension vector for each character, wherein the L-dimension vector includes a representation of the string of characters, generate a first vector from the L-dimension vector; and wherein the set of instructions that, when executed by the one or more processing units, cause the one or more processing units to process the one or more words, include instructions that, when executed by the one or more processing units, cause the one or more processing units to:

map each word onto a M-dimension vector using a M-dimension word embedding vector, and generate the second vector from the M-dimension vector.

18. The non-transitory computer-readable storage medium of claim 14, further comprising instructions that, when executed by the one or more processing units, cause the one or more processing units to:

determine additional index values starting from a second highest value in the third vector;

determine, using the predetermined array of solutions, additional output solutions located at the additional index values associated with the pre-determined array, wherein the additional output solutions are additional predictions of the request being made by the user;

send, with the output solution, the additional output solutions to the portable electronic device to be selected by the user.

19. The non-transitory computer-readable storage medium of claim 14, further comprising instructions that, when executed by the one or more processing units, cause the one or more processing units to:

receive a second input that provides user specific information, wherein the second input includes a location of the user;

process the user specific information to provide a fourth vector that represents a location sequence of the user; and process the fourth vector with the first and second vectors to obtain the third vector to determine the prediction of the request.

20. The non-transitory computer-readable storage medium of claim 14, further comprising instructions that, when executed by the one or more processing units, cause the one or more processing units to:

receive a second input that provides user specific information, wherein the second input includes recent activity related to an account of the user;

process the user specific information to provide a fourth vector that represents the recent activity related to the account of the user; and process the fourth vector with the first and second vectors to obtain the third vector to determine the prediction of the request.

* * * * *